(12) United States Patent
Gonzalez De Prado

(10) Patent No.: US 7,301,932 B1
(45) Date of Patent: Nov. 27, 2007

(54) METHOD AND SYSTEM FOR MULTIPLE ACCESS IN A RADIOCOMMUNICATION SYSTEM

(75) Inventor: Jose Luis Gonzalez De Prado, Madrid (ES)

(73) Assignee: Alcatel, Paris (FR)

( * ) Notice: Subject to any disclaimer, the term of this patent is extended or adjusted under 35 U.S.C. 154(b) by 767 days.

(21) Appl. No.: 09/598,896

(22) Filed: Jun. 22, 2000

(30) Foreign Application Priority Data

Jun. 25, 1999 (EP) .................................. 99500108

(51) Int. Cl.
*H04B 7/212* (2006.01)

(52) U.S. Cl. ................... 370/348; 370/443; 455/452.2

(58) Field of Classification Search ............... 370/310, 370/328, 329, 337, 347, 348, 468, 336, 345, 370/443

See application file for complete search history.

(56) References Cited

U.S. PATENT DOCUMENTS

| | | | | |
|---|---|---|---|---|
| 4,573,206 A * | 2/1986 | Grauel et al. ............... 455/453 |
| 5,563,883 A * | 10/1996 | Cheng ......................... 370/449 |
| 5,598,417 A * | 1/1997 | Crisler et al. ................ 370/348 |
| 5,640,395 A * | 6/1997 | Hamalainen et al. ........ 370/322 |
| 5,644,576 A * | 7/1997 | Bauchot et al. .............. 370/437 |
| 5,881,059 A * | 3/1999 | Deschaine et al. .......... 370/337 |
| 5,959,999 A * | 9/1999 | An ............................. 370/442 |
| 6,041,238 A * | 3/2000 | Tanoue ..................... 455/452.2 |
| 6,240,079 B1 * | 5/2001 | Hamalainen et al. ........ 370/337 |
| 6,424,645 B1 * | 7/2002 | Kawabata et al. ........... 370/347 |
| 6,477,151 B1 * | 11/2002 | Oksala ........................ 370/314 |
| 6,931,026 B1 * | 8/2005 | Lee et al. .................... 370/468 |
| 2001/0028644 A1 * | 10/2001 | Barzegar et al. ............ 370/352 |

* cited by examiner

*Primary Examiner*—Chi Pham
*Assistant Examiner*—Kevin Mew
(74) *Attorney, Agent, or Firm*—Sughrue Mion, PLLC

(57) ABSTRACT

A method for multiple access in a radiocommunication system which avoids forming a signaling multiframe with an inflexible turn of transmission. A fixed unit broadcasts over a pilot channel a predetermined number of virtual identities for signaling which form the signaling multiframe, so that when a remote unit wishes to transmit, it selects one of the virtual identities received. The time slots in the signaling multiframe are distributed among those remote units which have signaling messages to transmit to the fixed unit.

20 Claims, 2 Drawing Sheets

METHOD AND SYSTEM FOR MULTIPLE ACCESS IN A RADIOCOMMUNICATION SYSTEM

OBJECT OF THE INVENTION

The present invention relates to a method for allocating the radio and signalling resources, in general, of a multiple access radiocommunication system, which comprises a set of fixed units such that each of them has an coverage area or cell associated with it. Within each cell are located a plurality of remote units, which employ time division multiple access (TDMA) techniques for communicating with their fixed unit.

The multiple access method is of special, but not exclusive, application in a point-to-multipoint radiocommunication system, so that the allocation of the different time slots that constitute a frame, in the uplink direction of the communication, is carried out in a dynamic mode as a function of the traffic requirements of each of the remote units that constitute the radiocommunication system.

STATE OF THE ART

A radiocommunication system is divided into a plurality of cells, and each cell comprises a fixed unit normally connected by means of a cable network to a telephone transport network such as a public switched telephone network (PSTN).

Each fixed unit has associated a coverage area inside which it establishes communications via radio with those remote units located within its coverage area, by using time division multiple access (TDMA) techniques, that is, the frequency band is divided into time slots which are assigned to the sending and receiving of signals. Consequently, a number of communications can be transmitted simultaneously in a single frequency band.

In a conventional point-to-multipoint radiocommunication system, each remote unit transmits, in the uplink direction of the communication, in addition to the data bursts corresponding to the communications already established, signalling information relative to both the communications that are already established and to the new ones arising in the remote units.

This gives rise to the appearance within a TDMA frame of one or more time slots reserved for signalling, which have to be shared among all the remote units.

A commonly employed method consists in the cyclic allocation of usage times for these signalling slots in an inflexible manner as a function of the identity of each remote unit, in the form of a signalling multiframe.

In this way, each remote unit must wait for its signalling time to appear for sending a limited message, limited in length because the signalling channel is shared among all the remote units in an inflexible manner regardless of whether they require to signal or not. Thus, although a remote unit has no message to send, it has to occupy the allocated time, for example, with a stuffing message.

Similarly, if a remote unit has several messages to send, it must wait for successive turns in order to transmit the information in question, even although there are time slots in the same frame which are filled with stuffing information, that is there is an inflexible turn or order.

Consequently, a fixed unit will be able to communicate simultaneously with as many remote units as there are time slots for signalling in the signalling multiframe in the uplink direction of the communication.

As a consequence, it is necessary to provide a method whereby the number of remote units that can occupy the signalling multiframe is increased, without excessively increasing the number of time slots into which the signalling multiframe is divided, which would result in unacceptable delay times.

CHARACTERISATION OF THE INVENTION

The proposed multiple access method for a radiocommunication system overcomes the problems above indicated.

The radiocommunication system has its coverage area divided into a plurality of cells, so that within each cell there is at least one fixed unit that communicates with a plurality of remote units located inside the cell.

The access method avoids forming a signalling multiframe working with a fixed turn for transmitting. To this end, the fixed unit broadcasts over a pilot channel a predetermined number of virtual identities for signalling and that form the signalling multiframe, so that when a remote unit wishes to transmit information in the uplink direction, it selects one of the virtual identities received.

The fixed unit comprises a first controller means that establishes the number of virtual identities and, based on their occupancy level, increases or diminishes it. The occupancy level is a function of the traffic present at each moment.

Thus, the signalling multiframe is only used by those remote units that have messages to send. This method makes allocation of the signalling multiframe more flexible, reducing signalling delays.

In brief, the number of remote units that can communicate simultaneously with a fixed unit is a function of the number of time slots into which the signalling multiframe is divided, it not being possible to increase these indefinitely without increasing, in turn, the signalling delay. Thus, by use of the method proposed, it is possible to increase the number of remote units since the multiframe time slots are distributed among those units which have to transmit signalling to the fixed unit.

BRIEF DESCRIPTION OF THE FIGURES

A more detailed explanation of the invention is provided in the following description, based on the attached figures, in which.

DESCRIPTION OF THE INVENTION

Figure 1:
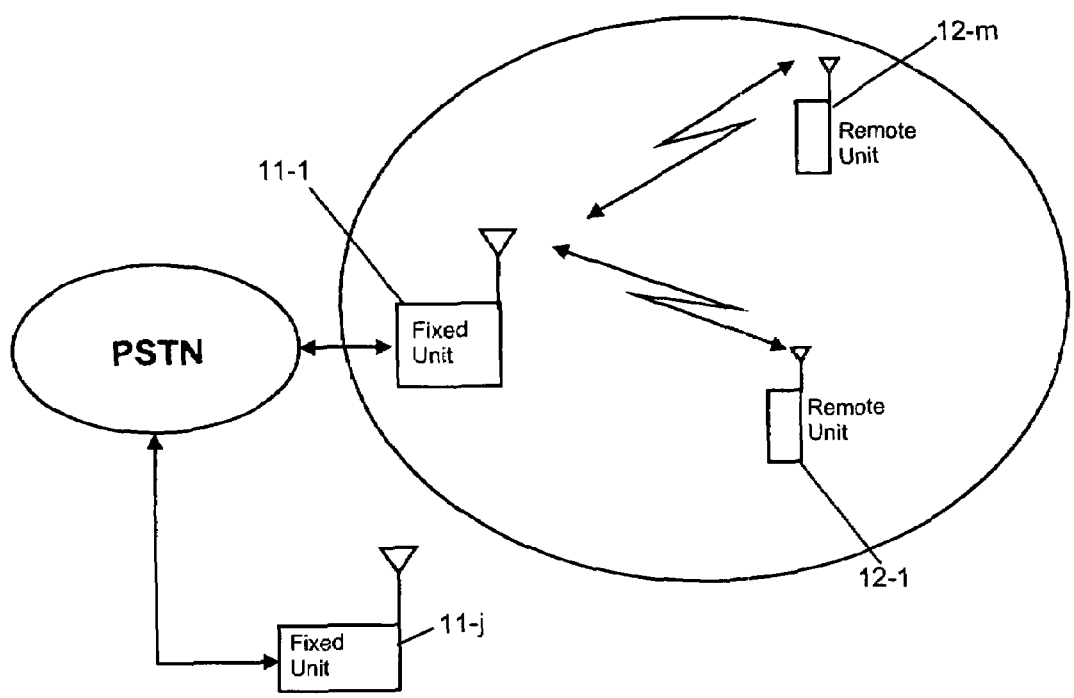
FIG. 1 shows a diagram of a point-to-multipoint radiocommunication system according to the invention.

FIG. 1 shows a preferred embodiment of the point-to-multipoint radiocommunication system, which comprises a set of fixed units 11-1 to 11-$n$ such that each one has associated with it a cell or coverage area of the radiocommunication system.

Each fixed unit 11-$j$ (where j=1, . . . , n) is connected via radio with a set of remote units 12-1 to 12-$m$ located within its coverage area. To carry out the communications between the different remote units 12-1 to 12-$m$ and the fixed unit 11-$j$ use is made of time division multiple access (TDM/TDMA) techniques.

The traffic generated by a remote unit 12-$i$ (where $i=1, \ldots, m$) is directed through the fixed unit 11-$j$ to a telephone transport network such as a public switched telephone network (PSTN).

According to the TDM/TDMA technique, a carrier frequency is divided into time slots that are grouped into frames, there being frames for both transmission directions. Within the TDMA frame there are time slots reserved for signalling between the fixed unit 11-$j$ and the remote units 12-1 to 12-$m$, which form a signalling multiframe.

Figure 2:
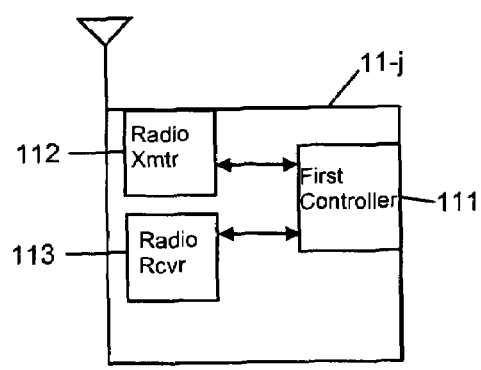
FIG. 2 shows a block diagram of a fixed unit according to the invention.

When a remote unit 12-$i$ wishes to transmit information relative to a communication, it inserts its data bursts into an allocated time slot of the frame. The time slot allocation is carried out by a first controller means 111 belonging to the fixed unit 11-$j$ (see FIG. 2).

According to the time slot allocation method proposed, the first controller means 111 incorporates an algorithm that determines a first predetermined number of virtual identities for signalling and implements it on the basis of the traffic conditions of the radiocommunication system. The virtual identities proposed form the signalling multiframe and are independent of the true identities of each remote unit 12-$i$, which shall be used for other purposes (management).

The virtual identities created are supplied to a first radio transmitter 112 of the fixed unit 11-$j$ to be broadcast over a pilot channel, being received in the remote unit 12-$i$ by means of a second radio receiver 123.

Figure 3:
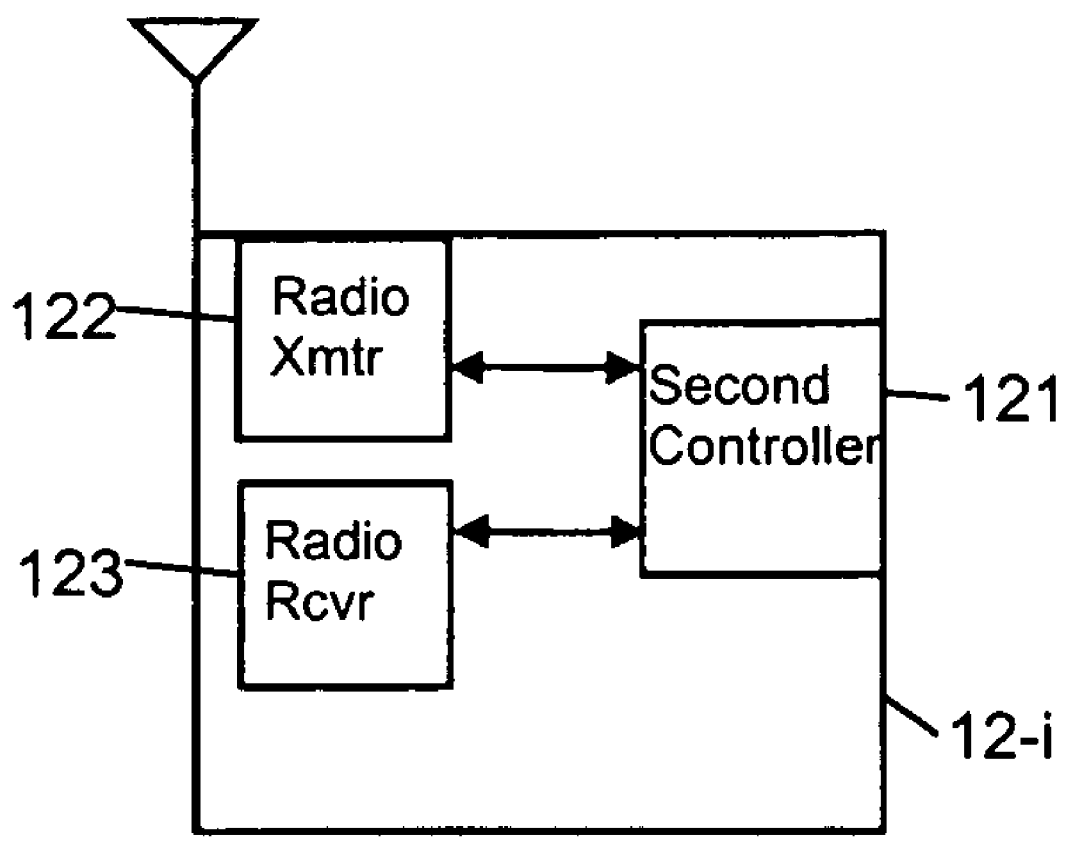
FIG. 3 shows a block diagram of a remote unit according to the invention.

Thus, when a subscriber connected to a remote unit 12-$i$ wishes to transmit a signalling message, for example in order to set up a communication, the remote unit 12-$i$ selects one of the virtual identities available, independently of its true identity, by employing a second controller means 121 (see FIG. 3).

The second controller means 121 receives from the second radio receiver 123 the proposed identities and makes the selection of one of them on the basis of traffic requirements and on the nature of the information to be transmitted, be this voice, data, video, television or other digital signal. The duration of traffic bursts is therefore variable.

The virtual identity selected shall indicate the order of transmission within the signalling multiframe. Thus, the remote unit 12-$i$ shall start to transmit, by means of a second radio transmitter 122, signalling messages in the time slot allocated within an uplink frame. The number of virtual identities conditions the duration of the signalling multiframe, there being a maximum duration permitted.

A first radio receiver 113 of the fixed unit 11-$j$ receives the signalling message and feeds it to the first controller means 111, which analyses it and records the virtual identity occupied.

The occupancy of this virtual identity is transmitted over the broadcast channel in order to prevent it being used by another remote unit 12-$k$, consequently, the signalling multiframe becomes reduced and shall try to occupy another virtual identity of the signalling multiframe.

When a signalling process is over, the virtual identity is once again made available for selection for another communication, and so on successively. The signalling multiframe is dynamic; that is, it is organised as a function of the number of virtual identities proposed at any given moment. If the virtual identities proposed by the fixed unit 11-$j$ are gradually taken up, the first controller means 111 increases the number of proposed virtual identities within the signalling multiframe. Consequently, the duration of the signalling multiframe increases and the spacing between bursts corresponding to a given communication also increases. As the signalling processes are gradually concluded, the first controller means 111 reduces the number of virtual identities proposed within the signalling multiframe.

During system start-up, and while a given traffic situation exists, the first controller means 111, by default, establishes a reduced number of virtual identities for selection by the remote units 12-1 to 12-$m$. For example, if the virtual identities 1 to 4 are put into play, a four time slots multiframe is obtained.

Thus, in the case where there is only one remote unit 12-$i$ with a call set-up process in course, it will choose one of the identities in play and will make use of the corresponding time slot. Since there are only four time slots, the multiframe duration is short, and the bit flow that the remote unit 12-$i$ enjoys is high.

The multiframe duration (time between consecutive bursts transmitted from the same remote unit 12-$i$), gradually increases as virtual identities are added in order to permit signalling from more remote units 12-1 to 12-$m$, and, in addition, the duration of the burst from each of the remote units 12-1 to 12-$m$ diminishes.

As the radio resources of the system are released, the fixed unit 11-$j$ puts the released virtual identities into play again, to be assigned to new calls and thereby avoid having to introduce more virtual identities than those necessary, which would lengthen the duration of the multiframe needlessly.

The fixed unit 11-$j$ transmits, over the broadcast channel, the virtual identities that are presently occupied, with an input acknowledgement message. The remote unit 12-$i$ that detects this acknowledgement message, shall continue to use its virtual identity and the corresponding time slot, while the rest shall interpret this as a warning of virtual identity and time slot occupancy.

In the event that another remote unit 12-$k$ wishes to initiate a call set-up process, it shall select another virtual identity available. If two remote units 12-$i$ and 12-$k$ coincide in the use of the same virtual identity, and consequently of the same time slot, the fixed unit 11-$j$ detects this collision and broadcasts a "not confirmed" message for the right to employ said virtual identity and time slot. The remote units 12-$i$ and 12-$k$ that tried to gain access, decline to use said virtual identity and time slot, open a time-out period and opt for the virtual identities proposed at that moment.

The invention claimed is:

1. A method for multiple access in a radio communication system that employs time division multiple access techniques, said method comprising the steps of:
    interchanging signaling messages, via a signaling multiframe, between at least one fixed unit and a set of remote units located within the coverage area associated with said fixed unit, the signaling multiframe comprising a predetermined number of virtual identities less than the number of said remote units and generated by a controller in the fixed unit,
    changing by said controller, the predetermined number of virtual identities for signaling based on the level of occupancy of the signaling multiframe, and
    using a virtual identity in the signaling multiframe by a remote unit only when sending a messages and releasing the virtual identity after the message transmission is complete.

2. The method for multiple access according to claim 1, wherein the number of virtual identities is less than the number of the remote units.

3. The method for multiple access according to claim 2, wherein the virtual identities are broadcast by a radio transmitter included in the fixed unit over a pilot channel in the downlink transmission direction.

4. The method for multiple access according to claim 3, wherein the pilot channel is received by a radio receiver included in a remote unit and is fed to said controller included in the remote unit for recording the predetermined number of virtual identities for signaling.

5. The method for multiple access according to claim 4, wherein a virtual identity is selected by said controller of the remote unit when the remote unit wishes to transmit a signaling message via a radio transmitter included in the remote unit, and the controller of the remote unit inserts the signaling message into the virtual identity selected and the signaling message is received in a radio receiver included in said fixed unit.

6. The method for multiple access according to claim 5, wherein the signaling multiframe is received in the radio receiver of said fixed unit by said controller of said fixed unit in order that the selected virtual identity will be marked as occupied and thereafter is broadcast in said pilot channel.

7. The method for multiple access according to claim 1, wherein the signaling multiframe is formed by a maximum number of virtual identities for signaling that is a function of the maximum duration permissible for said signaling multiframe.

8. A system for multiple access in a radio communication system which comprises at least one fixed unit having an associated coverage area within which is located a set of remote units, wherein the fixed unit and the remote units employ time division multiple access techniques to establish communications and to interchange signaling messages using a signaling multiframe, wherein the fixed unit comprises controller means for increasing or/and decreasing a predetermined number of virtual identities for signaling, which are independent of the true identities of the remote unit and generated by the controller means, based on the level of occupancy of the signaling multiframe, wherein a remote unit only uses a virtual identity in the signaling multiframe when sending a message and releases the virtual identity after the message transmission is complete.

9. The system for multiple access according to claim 8, wherein the number of the virtual identities is less than the number of the remote units.

10. The system for multiple access according to claim 9, wherein the fixed unit comprises a radio transmitter for broadcasting the virtual identities over a pilot channel in the downlink direction of the transmission.

11. The system for multiple access according to claim 10, wherein the remote unit comprises a radio receiver for receiving said pilot channel that is supplied to a controller means included in the remote unit for recording the predetermined number of virtual identities for signaling.

12. The system for multiple access according to claim 11, wherein the controller means of the remote unit selects a virtual identity when the remote unit wishes to transmit a signaling message, inserts the signaling message inside the virtual identity selected, and transmits the signaling message by a radio transmitter included in the remote unit so that a radio receiver included in the fixed unit receives the signaling message.

13. The system for multiple access according to claim 12, wherein the radio receiver of the fixed unit supplies the controller means of the fixed unit with the signaling multiframe, wherein the selected virtual identity is marked as occupied and thereafter is broadcast over the pilot channel.

14. A system for multiple access according to claim 8, wherein said controller means of the fixed unit generates a number of virtual identities for signaling as a function of the level of occupancy of said signaling multiframe, so that there is a maximum number of virtual identities for signaling which is a function of the maximum duration permissible for said signaling multiframe.

15. A method according to claim 1, wherein each virtual identity when in use is for sending signaling information with respect to a single one of said remote units.

16. A system according to claim 8, wherein each virtual identity when in use is for sending signaling information with respect to a single one of said remote units.

17. A method according to claim 1, wherein a given remote unit may use different ones of said virtual identities for successive transmissions of signaling information.

18. A system according to claim 8, wherein a given remote unit may use different ones of said virtual identities for successive transmissions of signaling information.

19. A method according to claim 1, wherein until release of a virtual identity by a particular remote unit the virtual identity cannot be used to send signaling information for any other remote unit.

20. A system according to claim 8, wherein until release of a virtual identity by a particular remote unit the virtual identity cannot be used to send signaling information for any other remote unit.

* * * * *